US008974624B2

(12) United States Patent
Bixen

(10) Patent No.: US 8,974,624 B2
(45) Date of Patent: Mar. 10, 2015

(54) LABEL APPLICATOR INCLUDING A PLURALITY OF AIR FLOW GENERATORS

(75) Inventor: Robert W. Bixen, Dorsey, IL (US)

(73) Assignee: Illinois Tool Works Inc., Glenview, IL (US)

( * ) Notice: Subject to any disclaimer, the term of this patent is extended or adjusted under 35 U.S.C. 154(b) by 145 days.

(21) Appl. No.: 13/548,888

(22) Filed: Jul. 13, 2012

(65) Prior Publication Data

US 2014/0014264 A1 Jan. 16, 2014

(51) Int. Cl.

| | |
|---|---|
| ***B29C 65/00*** | (2006.01) |
| ***B32B 37/00*** | (2006.01) |
| ***B29C 43/22*** | (2006.01) |
| ***B29C 59/00*** | (2006.01) |
| ***B29C 45/00*** | (2006.01) |
| ***B29C 47/00*** | (2006.01) |
| ***B29C 43/02*** | (2006.01) |
| ***B29C 49/00*** | (2006.01) |
| ***B29C 51/00*** | (2006.01) |
| ***B29D 24/00*** | (2006.01) |
| ***B29D 29/00*** | (2006.01) |

(Continued)

(52) U.S. Cl.
USPC ........... 156/285; 156/286; 156/382; 264/509; 264/511; 264/553; 264/571; 425/504; 425/546; 425/388; 425/405.1; 425/405.2

(58) Field of Classification Search
CPC ............ B65C 1/00; B65C 1/02; B65C 1/021; B65C 1/023; B65C 3/00; B65C 9/00; B65C 9/08; B65C 9/14; B65C 9/1819; B65C 9/1826; B65C 9/28; B32B 37/00; B32B 37/0007; B32B 37/10; B32B 37/1018; B32B 37/1009; B32B 37/12; B32B 38/18; B32B 38/1825; B32B 38/1833; B32B 38/1853
USPC .......... 156/285, 286, 382; 264/509, 511, 553, 264/571; 425/504, 546, 388, 405.1, 405.2
See application file for complete search history.

(56) References Cited

U.S. PATENT DOCUMENTS 3,483,059 A * 12/1969 Dinter ........................... 156/364
4,556,443 A 12/1985 Moya et al.

(Continued)

FOREIGN PATENT DOCUMENTS

DE 102010040009 A1 3/2012

OTHER PUBLICATIONS

ISR and W/O for PCT/US2013/050082 dated Dec. 6, 2013 (12 pgs.).

*Primary Examiner* — Richard Crispino
*Assistant Examiner* — Matthew Hoover
(74) *Attorney, Agent, or Firm* — The Small Patent Law Group LLC; Christopher R. Carroll

(57) ABSTRACT

A label applicator that includes an applicator housing having a flow chamber and a suction side. The suction side has one or more openings that allow air to pass therethrough. The label applicator also includes first and second air flow generators that are fluidly coupled with the flow chamber. The first and second air flow generators are configured to generate first and second air flows, respectively, through the flow chamber. The label applicator also includes a valve mechanism that is positioned in the flow chamber to direct the first and second air flows through the flow chamber of the applicator housing. The valve mechanism includes a diverter valve and an electric actuator. The actuator is configured to move the diverter valve within the flow chamber to different positions during a label application operation.

21 Claims, 8 Drawing Sheets

(51) Int. Cl.

| | |
|---|---|
| ***B29C 43/10*** | (2006.01) |
| ***A23P 1/00*** | (2006.01) |
| ***B29B 11/06*** | (2006.01) |
| ***B29C 35/00*** | (2006.01) |
| ***B28B 21/36*** | (2006.01) |
| ***A01J 21/00*** | (2006.01) |
| ***A01J 25/12*** | (2006.01) |
| ***A21C 3/00*** | (2006.01) |
| ***A21C 11/00*** | (2006.01) |
| ***A23G 1/20*** | (2006.01) |
| ***A23G 3/02*** | (2006.01) |
| ***B28B 11/08*** | (2006.01) |
| ***B29C 55/28*** | (2006.01) |

(56) References Cited

U.S. PATENT DOCUMENTS

| | | | | |
|---|---|---|---|---|
| 2009/0133815 | A1 * | 5/2009 | Okuno et al. ................. | 156/238 |
| 2012/0205050 | A1 | 8/2012 | Bixen et al. | |

* cited by examiner

LABEL APPLICATOR INCLUDING A PLURALITY OF AIR FLOW GENERATORS

BACKGROUND

The subject matter described herein relates generally to an applicator that is configured to apply a label to a target object using a flow of air.

In some known systems, a label applicator is configured to receive, momentarily hold, and then apply a label to a target object. For instance, a chamber of the label applicator may be in flow communication with a pneumatic system that controls the flow of air through the flow chamber. The pneumatic system includes an electric fan that generates an air flow into the chamber. The air flow is used to momentarily hold a label against a side of the label applicator. During application of the label, the pneumatic system drives air out of the flow chamber to blow the label onto the target object. Typically, the pneumatic system includes a compressed air source that provides pressurized air that drives the label onto the target object. The pneumatic system is usually a large, separate system that was previously established in, for example, a factory building.

Label applicators that utilize pneumatic systems having compressed air sources may present undesirable complexities due to the pressurized air system. For instance, such label applicators are not transportable because the pipes, tubes, and/or hoses of the pneumatic system are sealed to the label applicator. Moreover, air from the compressed air source can be contaminated with water vapor, compressor oils, and/or coolants. The contaminated air may lead to inconsistent application of the labels or labels that are poorly applied to the target objects. In addition, air compressors may be inefficient in using electrical energy to generate compressed air.

BRIEF SUMMARY

In one embodiment, a label applicator is provided that includes an applicator housing having a flow chamber and a suction side. The suction side has one or more openings that allow air to pass therethrough. The label applicator also includes first and second air flow generators that are fluidly coupled with the flow chamber. The first and second air flow generators are configured to generate first and second air flows, respectively, through the flow chamber. The label applicator also includes a valve mechanism that is positioned in the flow chamber to direct the first and second air flows through the flow chamber of the applicator housing. The valve mechanism includes a diverter valve and an electric actuator. The actuator is configured to move the diverter valve within the flow chamber to a holding position to direct the first air flow generated by the first air flow generator through the suction side into the flow chamber to hold a label to the suction side. The actuator is also configured to move the diverter valve within the flow chamber to an application position to direct the second air flow generated by the second air flow generator through the suction side to force the label away from the suction side toward a target object in order to apply the label to the target object.

In another embodiment, a label applicator is provided that includes an applicator housing having a flow chamber and having a suction side and a blow vent. Each of the suction side and the blow vent has one or more openings that allow air to pass therethrough. The label applicator also includes an electric high-pressure blower that is coupled to the applicator housing and is configured to provide an air flow through the flow chamber. The label applicator also includes a valve mechanism having a diverter valve and an electric actuator. The actuator is configured to selectively move the diverter valve between holding and application positions. The diverter valve directs the air flow provided by the high-pressure blower through the blow vent when in the holding position and through the suction side when in the application position to apply a label to a target object.

In another embodiment, a label application method is provided that includes positioning a label along a suction side of an applicator housing. The suction side has one or more openings that allow air to pass therethrough. The applicator housing includes a flow chamber having a diverter valve and a cover valve disposed therein. The method also includes moving the diverter valve and the cover valve to corresponding holding positions to form a first flow channel through the flow chamber. The method also includes drawing the label toward the suction side by providing a first air flow through the first flow channel and through the suction side in a first direction, wherein the first air flow in the first flow channel is provided by a suction generator. The method further includes moving the diverter valve and the cover valve to corresponding application positions to form a second flow channel through the flow chamber. The first and second flow channels are fluidly coupled to an exterior of the applicator housing through the suction side. The method also includes ejecting the label away from the suction side by providing a second air flow through the second flow channel and through the suction side in a second direction. The air flow in the second flow channel is provided by a blow generator.

BRIEF DESCRIPTION OF THE DRAWINGS

Reference is now made briefly to the accompanying drawings, in which.

DETAILED DESCRIPTION

Figure 1:
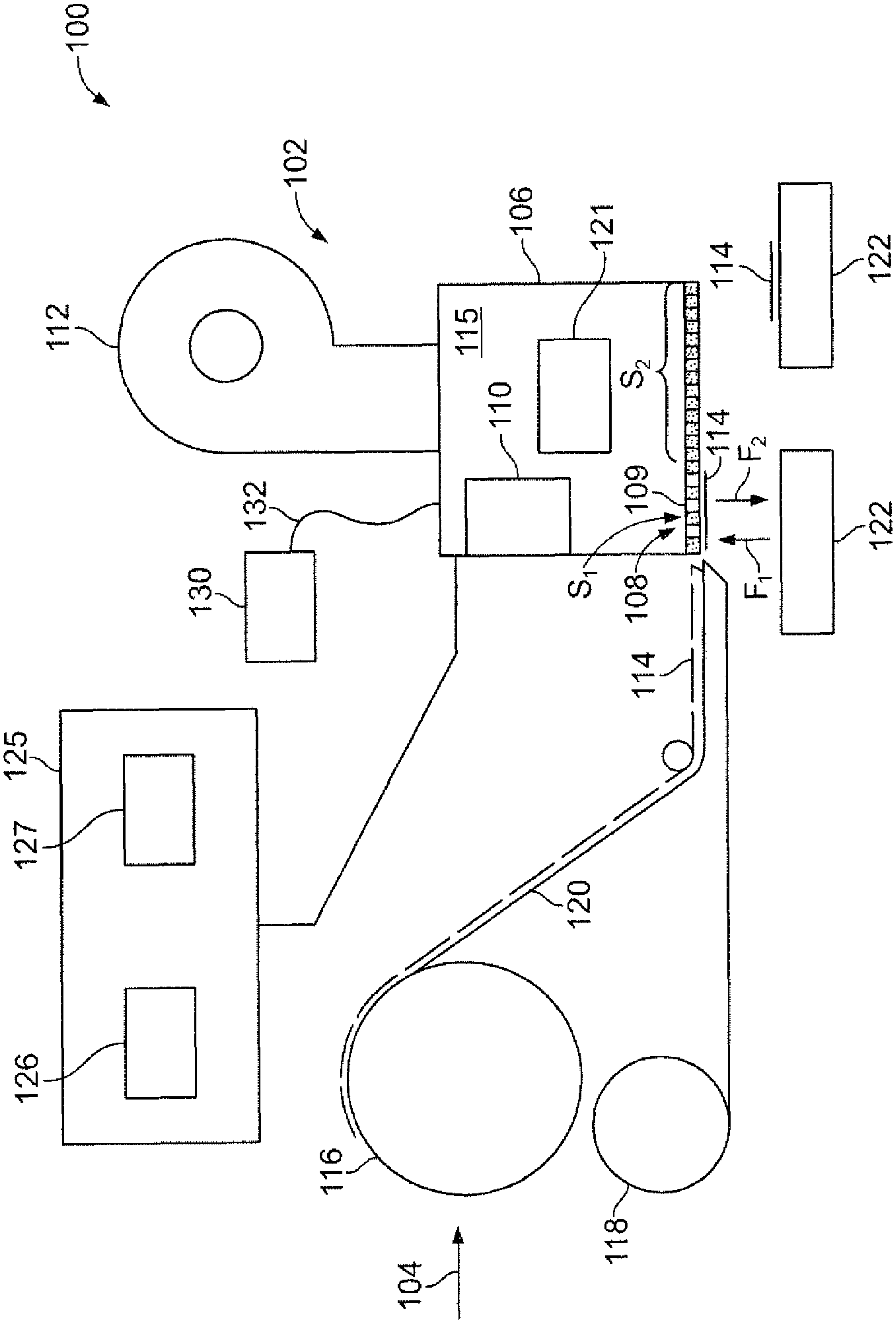
FIG. 1 is schematic diagram of a label application system formed in accordance with one embodiment.

Embodiments described herein include methods, systems, and applicators for applying a label to a target object. An application operation may include attaching one or more labels to one or more corresponding target objects. The term “target object” is not intended to be limiting and may include any object, such as a commercial good or a container (e.g., box) that holds a commercial good. The methods, systems, and applicators described herein may use first and second air flow generators (e.g., fans, blowers, and the like). In particular embodiments, each of the first and second air flow generators is an electrically powered air flow generator that is a part of the label applicator (e.g., attached to the label applicator housing). For instance, neither of the air flow generators may include or be part of a compressed air source that is remotely located with respect to the label applicator. In addition, one or more embodiments may include an electrically-controlled valve mechanism that operates in conjunction with the first and second air flow generators to direct air flow in a designated manner for applying the label.

The first and second air flow generators may be of the same type or different types. Each of the first and second air flow generators may provide or generate an air flow through a chamber of a housing during the application operation. The housing, in turn, may direct the air flows as desired. During a single application operation, the first and second air flow generators may be operated at separate times or at partially overlapping times, or each of the first and second air flow generators may be operated continuously throughout the single application operation. Each of the first and second air flow generators may also be operated continuously over multiple application operations. In particular embodiments, the first and second air flow generators provide air flows in opposite directions through a common port (e.g., a suction side). The corresponding air flows may have different flow rates and different air pressures.

As used herein, the meaning of "label" is not intended to be limited to an adhesive sticker or piece of paper that identifies an object to which the sticker or paper is applied. Instead, a label may be any substance or material (e.g., paper, cloth, strip of plastic, and the like) that is capable of being held and ejected from a label applicator as described herein to attach to a target object. A label is not required to identify or provide identifying information for the object. For example, a label can be used for decorative or ornamental purposes only. Moreover, it is not necessary for the entire label to be applied to the object. Instead, a first portion of the label may be secured to the object while a second portion of the label is movable with respect to the object.

In some embodiments, ambient air may be utilized during the label application operation. However, as used herein, the term "air," is not intended to be limited to ambient air, but may also include a single type of gas or a designated mixture of gases. Moreover, a single gas or a single mixture of gases is not required to be used exclusively throughout the application process. For example, a designated gas (or mixture of gases) may be used during the ejection operation described below while ambient air (or other gas(es)) may be used during the suction operation. Thus, it is understood that the term "air" in the claims below may include ambient air and/or one or more designated gases at any time during the application process. In particular embodiments, however, the label applicator uses only ambient air to momentarily hold and apply the label to the target object.

FIG. 1 is schematic diagram of a label application system 100 formed in accordance with one embodiment. The system 100 includes a label applicator 102 and a label supplier 104. The label applicator 102 includes an applicator housing 106 having a suction side 108 with one or more openings 109 that allow air to pass into and pass from an internal flow chamber 115 of the applicator housing 106. The label applicator 102 also includes a first air flow generator 110 and a second air flow generator 112 that are each fluidly coupled (e.g., in fluid communication with) the flow chamber 115. The first and second air flow generators 110, 112 are hereinafter referred to as the suction generator 110 and the blow generator 112, respectively. The label applicator 102 may also include a valve mechanism 121 that operates in conjunction with the suction and blow generators 110, 112 to move air through the suction side 108 in a designated manner during a label-application operation.

The label supplier 104 is configured to provide labels 114 proximate to the suction side 108. In some embodiments, the label supplier 104 may include a supply roll 116 and an uptake roll 118 that roll a web 120 of the labels 114 proximate to the suction side 108. For instance, the web 120 may slide directly against a portion of the suction side 108. The labels 114 may be stripped from the web 120. The suction side 108 may be shaped (e.g., curved) in a manner that facilitates stripping the label 114 from the web 120. However, it is noted that the illustrated embodiment only demonstrates one example of how the labels 114 may be provided to the suction side 108. It is understood that the labels 114 may be provided to the suction side 108 in various manners. For example, the labels 114 may be provided individually (e.g., separate from the other labels) instead of being provided to the suction side 108 as part of the web 120.

The label applicator 102 is configured to operate in a holding (or suction) mode and an ejection (or blow) mode. More specifically, the suction and blow generators 110, 112 are configured to operate with the valve mechanism 121 to control a flow of air through the suction side 108. As shown in FIG. 1, a first set $S_1$ of holes 109 are open (e.g., allowing air to flow therethrough) and a second set $S_2$ of holes 109 are closed. The number and arrangement of holes 109 that are open may be determined by the designated application. During the holding mode, the suction generator 110 provides a first air flow (or suction) in which the air flows into the flow chamber 115 as indicated by the arrow $F_1$ through the first set $S_1$ of holes 109 thereby drawing or pulling one or more of the labels 114 against the suction side 108. The suction may cause the label 114 to be separated from the web 120 or, alternatively, the label 114 may be separated from the web 120 prior to the label applicator 102 drawing the label 114 to the suction side 108. During the ejection mode, the blow generator 112 provides a second air flow through the suction side 108 in a direction that is away from the suction side 108 as indicated by the arrow $F_2$. If a label 114 is being held against or proximate to the suction side 108 at this time, the label 114 is pushed away (e.g., ejected or propelled) onto a corresponding target object 122. Thus, the suction and blow generators 110, 112 may be operable such that air pressure along the suction side 108 is configured to draw the label 114 against the suction side 108 during the holding mode and eject the label 114 during the ejection mode. In some embodiments, the suction force that draws the label toward the suction side 108 or the ejection force that propels the label 114 away from the suction side 108 is sufficient to separate the label 114 from a remainder of the web 120.

At least one of the label 114 or the target object 122 may have an adhesive. In some embodiments, as the second air flow presses the label 114 against the target object 122, the label 114 is attached (e.g., adhered) to the target object 122. The application operation is described with respect to a single label. In other embodiments, however, multiple labels may be simultaneously drawn toward the suction side 108 and ejected therefrom. Thus, in a single application operation, one or more labels 114 may be separated from the web 120, drawn against the suction side 108, and then ejected onto and attached to the target object 122. In some embodiments, the above-described application operation may occur numerous times in a single minute. For example, the application operation may occur at least about 20 times per minute or, more particularly, at least about 40 times per minute. Even more particularly, the application process may occur at least about 60 times per minute, 200 times per minute, 400 times per minute or more. However, in other embodiments, the application process may occur less than one time per minute.

In some embodiments, the label applicator 102 (or the system 100) is readily transportable from one location to another location. For example, the label applicator 102 may include wheels or may be sized and shaped such that an individual or two or three individuals can move the label applicator 102 to another location. The label applicator 102 (or the system 100) may be a stand-alone device that is movable as a unit. In some embodiments, each of the suction and blow generators 110, 112 is secured (e.g., mechanically affixed) directly or indirectly to the applicator housing 106 such that the applicator housing 106 and the suction and blow generators 110, 112 move with each other when the label applicator 102 is transported. In other words, at least one of the suction and blow generators 110, 112 may have a stationary position relative to the applicator housing 106. In some cases, the label applicator 102 may be transported without significant disassembling of the label applicator 102. For example, the label applicator 102 may be moved without uncoupling the suction and blow generators 110, 112 with respect to the applicator housing 106. In some embodiments, the system 100 may be moved without uncoupling the label supplier 104.

In some embodiments, each of the suction and blow generators 110, 112 of the label applicator 102 is electrically operated and controlled. For example, an electrical energy source 130 may be electrically coupled to the label applicator 102 through a single power cable 132. The power necessary for operating the suction and blow generators 110, 112 may be provided by the energy source 130. In some embodiments, the system 100 is all-electric such that the label applicator 102 and the label supplier 104 are powered by the energy source 130. In other embodiments, however, multiple energy sources and/or cables may be used.

Moreover, the label applicator 102 may include a computing system 125 that is communicatively coupled to the label applicator 102 and configured to control operation of the label applicator 102. More specifically, the computing system 125 may control operation of the suction and blow generators 110, 112 and the valve mechanism 121 to apply the labels 114 to the target objects 122. In some embodiments, the computing system 125 may also control operation of other parts of the system 100. For example, the computing system 125 may control operation of the label supplier 104.

The computing system 125 may include one or more processors/modules that are configured to instruct the suction and blow generators 110, 112 and the valve mechanism 121 to operate in a designated manner during, for example, application of the label 114 to the target object 122. The computing system 125 is configured to execute a set of instructions that are stored in one or more storage elements (e.g., instructions stored on a tangible and/or non-transitory computer readable storage medium, excluding signals) to control operation of the system 100 or the label applicator 102. The set of instructions may include various commands that instruct the computing system 125 as a processing machine to perform specific operations such as the operations, processes, and methods described herein. In FIG. 1, the computing system 125 is indicated as a separate unit with respect to the label applicator 102. However, it is understood that computing system 125 is not necessarily separate from the label applicator 102. Instead, the computing system 125 may be an on-board or integral component of the label applicator 102. For example, the computing system 125 may be affixed to the applicator housing 106. In other embodiments, however, the computing system 125 is separate from, but communicatively coupled to, the label applicator 102.

The computing system 125 may include an air-flow module 126 and a valve-control module 127. The air-flow module 126 is configured to control operation of the suction and blow generators 110, 112, and the valve-control module 127 is configured to control operation of the valve mechanism 121. The valve mechanism 121 may be similar to the valve mechanism 220 (FIGS. 2-5) and include an electric actuator that is operatively coupled to different valves (e.g., a diverter valve and a cover valve). The electric actuator may be capable of selectively moving and holding the valves at designated positions in the flow chamber 115 to direct the air flow during an application operation.

By way of example, to initiate or transition to the holding mode, the air-flow module 126 may command the suction generator 110 to generate an air flow at a designated flow rate. The air-flow module 126 may also command the blow generator 112 to generate an air flow at a designated flow rate. The designated flow rate for the blow generator 112 may be less than the designated flow rate for the suction generator 110 during the holding mode. Furthermore, in some cases, the blow generator 112 may be powered off during the holding mode. In other embodiments, however, the air-flow module 126 may command the blow generator 112 to generate a continuous air flow that does not vary the flow rate for the holding and ejection modes.

For the holding mode, the valve-control module 127 may command the electric actuator to selectively move the valves to a first configuration such that one or more flow channels are formed. The one or more flow channels of the first configuration may direct the air flow provided by the suction generator 110 to draw air through the suction side 108 to momentarily hold the label 114. In alternative embodiments, the air flow from the blow generator 112 may also be used with the air flow from the suction generator 110 to hold the label 114.

To initiate or transition to the ejection mode, the air-flow module 126 may command the blow generator 112 to generate an air flow at a designated flow rate. The air-flow module 126 may also command the suction generator 110 to generate an air flow at a designated flow rate. The designated flow rate for the suction generator 110 may be less than the designated flow rate for the blow generator 112 during the ejection mode. In some embodiments, the suction generator 110 may be powered off such that the flow rate is zero.

For the ejection mode, the valve-control module 127 may command the electric actuator to selectively move the valves to a second configuration such that one or more flow channels are formed. The one or more flow channels of the second configuration may direct the air flow provided by the blow generator 112 to propel the label 114 away from the impact plate. In alternative embodiments, the air flow from the suction generator 110 may also be used with the air flow from the blow generator 112 to propel the label 114 from the suction side 108.

Although not shown, the system 100 or the label applicator 102 may include a user interface that is communicatively coupled to the computing system 125. The user interface may be configured to receive user inputs for controlling operation of the system 100 or the label applicator 102. The user interface may include software components and hardware components, such as displays, touch-sensitive screens, keyboards, switches, buttons, levers, and the like.

Figure 2A:
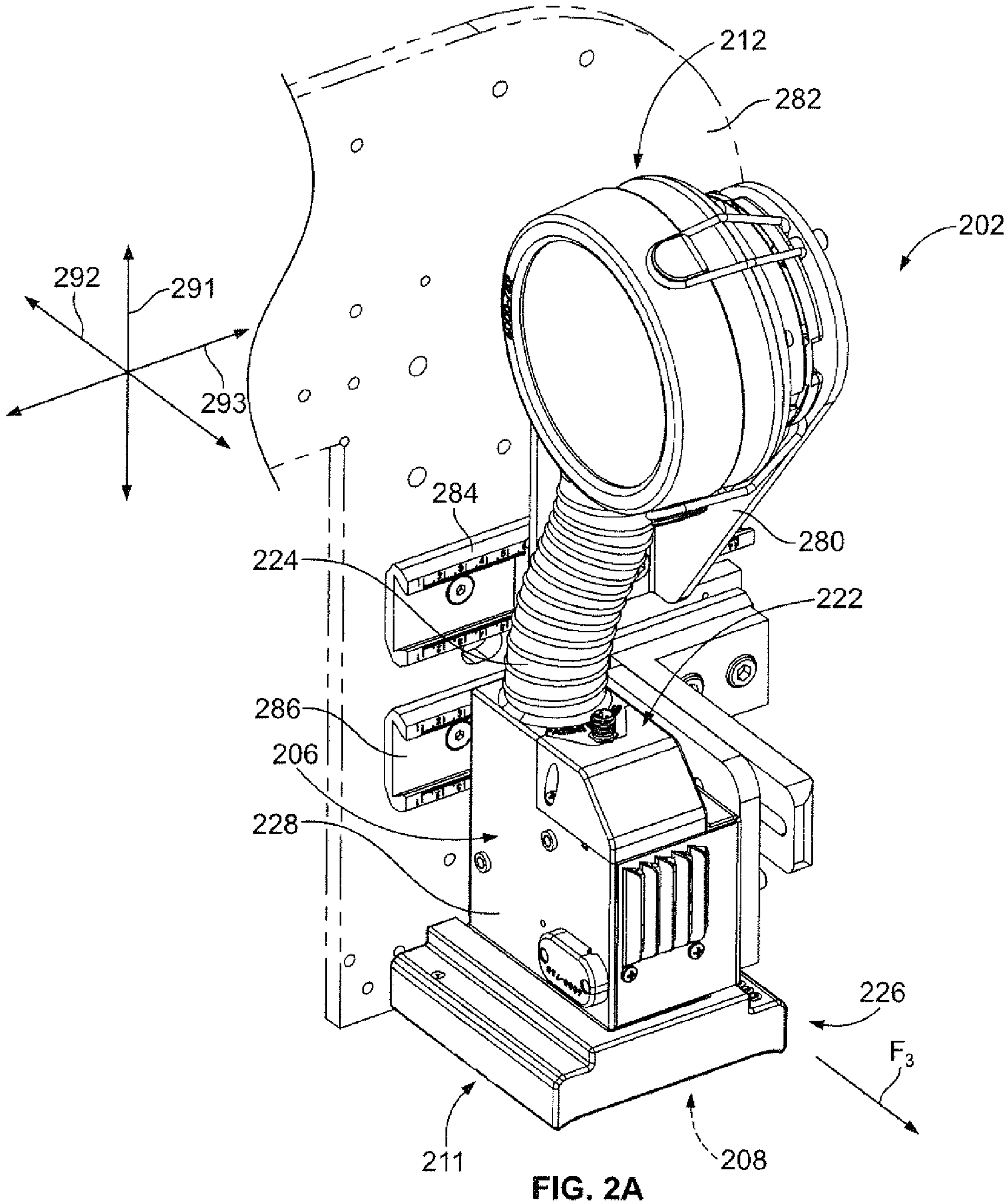
FIG. 2A is a perspective view of a label applicator formed in accordance with one embodiment.
Figure 2B:
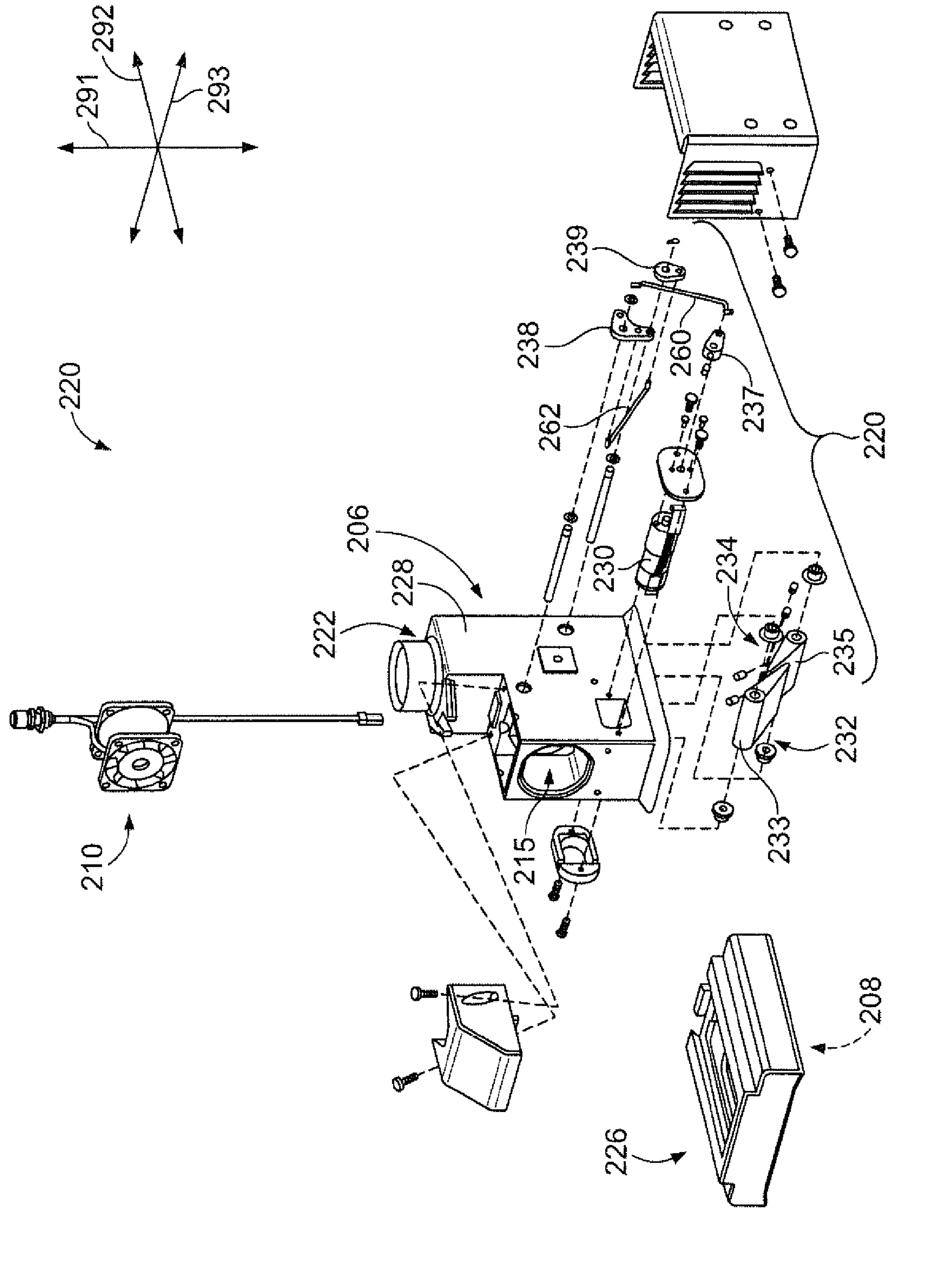
FIG. 2B is an exploded view of a portion of the label applicator shown in FIG. 2A.

FIG. 2A is a perspective view of a label applicator 202, and FIG. 2B is an exploded view of a portion of the label applicator 202 formed in accordance with one embodiment. The label applicator 202 is oriented with respect to mutually perpendicular axes, including a mounting axis 291 and lateral axes 292, 293. In some embodiments, the mounting axis 291 is generally aligned with a force of gravity. However, the mounting axis 291 is not required to be aligned with gravity. The label applicator 202 may have similar features as described above with respect to the label applicator 102 (FIG. 1) and may be used in a label application system (not shown), such as the system 100 (FIG. 1). For example, the label applicator 202 may include an applicator housing 206 having a suction side 208 with one or more openings 209 (FIG. 7) that allow air to pass into and out of an internal flow chamber 215 (shown FIG. 2B and also shown in FIGS. 4 and 5) of the applicator housing 206. The suction side 208 is part of a grid plate assembly 226 that is removably attached to the applicator housing 206. The applicator housing 206 also includes a loading (or intake) side 222. The loading side 222 is substantially opposite the suction side 208 in the illustrated embodiment. The label applicator 202 also includes a suction generator 210 (or first air flow generator) (shown in FIG. 2B) and a blow generator 212 (or second air flow generator) (shown in FIG. 2A) that are each fluidly coupled (e.g., in fluid communication with) the flow chamber 215.

In the illustrated embodiment, each of the suction and blow generators 210, 212 is coupled to the applicator housing 206 such that the suction and blow generators 210, 212 have stationary positions relative to the applicator housing 206. For example, the suction generator 210 is directly coupled to the applicator housing 206 in the flow chamber 215. As shown in FIG. 2A, the blow generator 212 may be directly coupled to a bracket 280, which may be directly coupled to a baseplate or wall 282 through mounting hardware 284. The baseplate 282, in turn, may be directly coupled to the applicator housing 206 through mounting hardware 286. However, in alternative embodiments, the suction and blow generators 210, 212 may not be secured to the applicator housing 206 such that the suction and blow generators 210, 212 have fixed stationary positions with respect to the applicator housing 206.

The suction generator 210 may be located in an interior of the applicator housing 206 or, alternatively, located external to the applicator housing 206. The suction generator 210 may be an electrically-powered fan, such as an axial fan, a centrifugal or squirrel cage-type fan, a cross-flow fan, a bladeless-type fan, and the like. In some embodiments, the suction generator 210 is configured to operate intermittently. For example, the suction generator 210 may be fully operational such that the suction generator 210 provides the designated air flow during the holding mode, but only partially operational (or not operational) during the ejection mode such that the designated air flow is not achieved. However, in other embodiments, the suction generator 210 continues to operate during the ejection mode. When exiting the applicator housing 206, the air flow provided by the suction generator 210 exits in a direction as indicated by the arrow $F_3$ (shown in FIG. 2A) from a side of the applicator housing 206. The direction $F_3$ is orthogonal to the mounting axis 291. However, in alternative embodiments, the air flow may be in other directions and may exit through the suction side 208 or the loading side 222.

As shown in FIG. 2A, the blow generator 212 is coupled to the loading side 222. The loading side 222 and the suction side 208 may face in opposite directions along the mounting axis 291. The blow generator 212 may be positioned above the applicator housing 206. The blow generator 212 is fluidly coupled to the loading side 222 through a flexible conduit or hose 224. However, in other embodiments, the blow generator 212 may be coupled to other sides.

In particular embodiments, the blow generator 212 is an electric high-pressure blower. For example, the air flow provided by the blow generator 212 may be provided at a pressure of at least about 5 pounds per square inch (psi) (e.g., about 34.5 kiloPascals) or at least about 1 psi (e.g., 6.9 kiloPascals). In such embodiments in which the suction and blow generators 210, 212 are both electric, the label applicator 202 (and the corresponding system) may operate on electric power alone. As such, it is not necessary to fluidly couple the label applicator 202 to a complex pneumatic system, such as those that are already part of a building or structure and have fixed positions. In such cases, the label applicator 202 may be freely moved to any area or room unlike other label applicators that rely on pneumatic systems to control operations of the applicators.

As shown, the label applicator 202 may include only a single blow generator and only a single suction generator. In other embodiments, however, the label applicator 202 may include a plurality of blow generators and/or a plurality of suction generators to control the air flows through the suction side 208. In such embodiments, the multiple blow generators and/or the multiple suction generators may be selectively operated to control a flow rate of the air flow through the suction side 208. For example, for some label applications, only one of two blow generators may be operated while, for other label applications, two of two blow generators may be operated.

The grid plate assembly 226 includes a leading edge 211 (FIG. 2A) along the suction side 208. As described below with respect to FIGS. 7 and 8, the leading edge 211 may be shaped to engage a label during the application operation to facilitate removing the label from the web. The grid plate assembly 226 may be removable and/or adaptable by an operator of the label applicator 202 or automatically by the system of which the label applicator 202 is a part. For example, the grid plate assembly 226 can be readily separated from a main housing portion 228 such that neither the grid plate assembly 226 nor the housing portion 228 are damaged or destroyed. Alternatively or in addition to, the grid plate assembly 226 may include an opening adapter (not shown) that is configured to change a configuration of the holes 209 (FIG. 7) along the suction side 208 that are open to allow air to flow therethrough. The holes may be similar to the openings 109 (FIG. 1). More specifically, the opening adapter may include a panel that is slidable (e.g., rotatable and/or axial). When moved to a different position or orientation, the slidable panel may open some holes and cover others. Whether alternative grid plates are used or whether an opening adapter is used, the holes may have different dimensions to control the flow of air. Accordingly, a flow rate of the air flow through the suction side 208 may be adjustable.

As shown in FIG. 2B, the label applicator 202 may also include a valve mechanism 220 that operates in conjunction with the suction and blow generators 210, 212 to move air through the suction side 208. The valve mechanism 220 may include one or more actuators, one or more valves, and one or more linkages that operatively couple the valve(s) and the actuator(s). The valve mechanism 220 and the suction and blow generators 210, 212 may be communicatively coupled to and controlled by a computing system that includes one or more processors. The computing system may be similar to the computing system 125 (FIG. 1) and include an air-flow module and a valve-control module, such as the modules 126, 127 described above. The computing system may automatically operate the valve mechanism 220 and the suction and blow generators 210, 212 to control the air flows through the suction side 208 in a similar manner as described above with respect to the system 100 and, more particularly, the label applicator 102.

Figure 3:
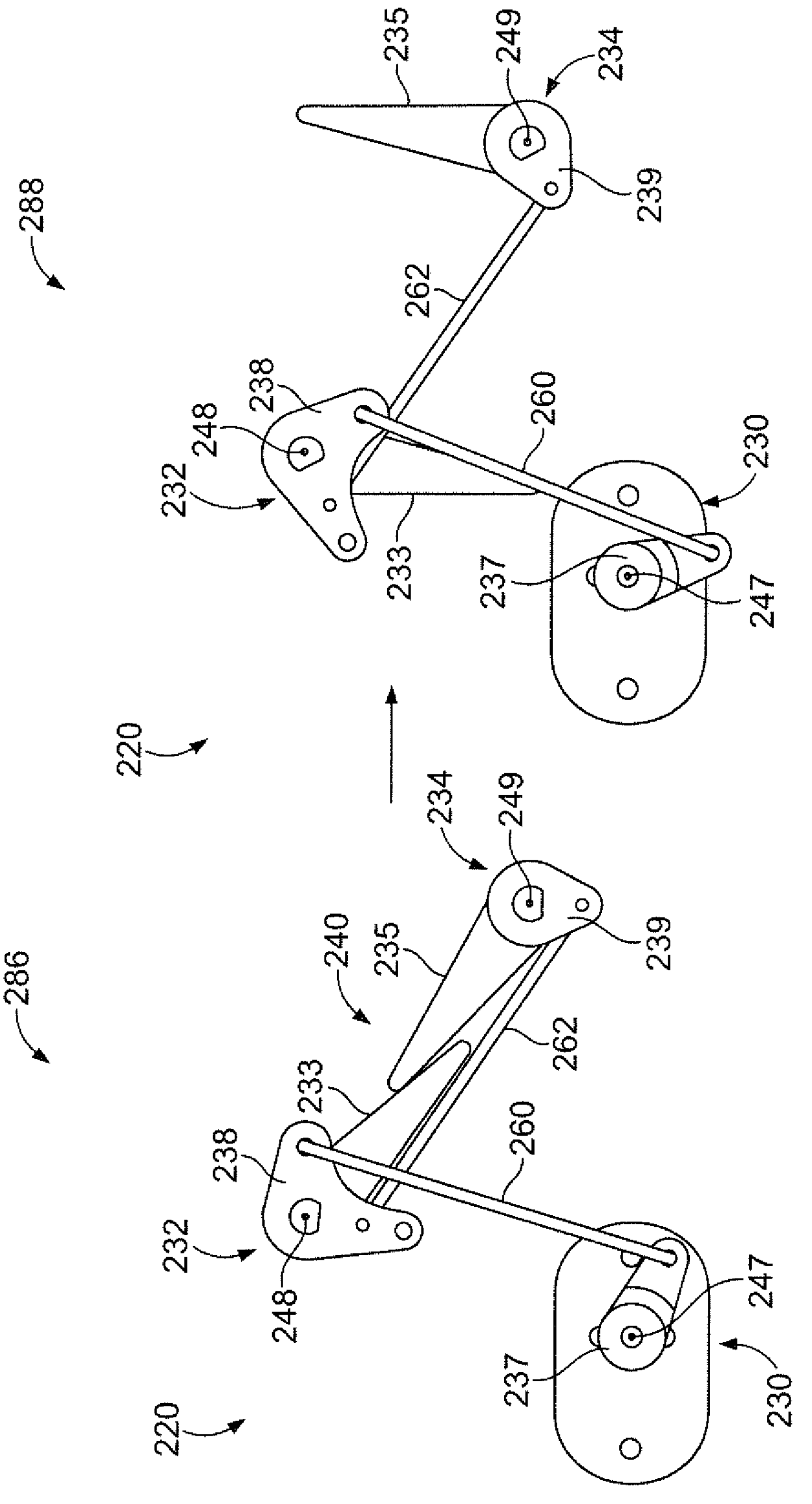
FIG. 3 illustrates a valve mechanism of the label applicator of FIG. 2A when the label applicator is at a holding mode and at an ejection mode.
Figure 4:
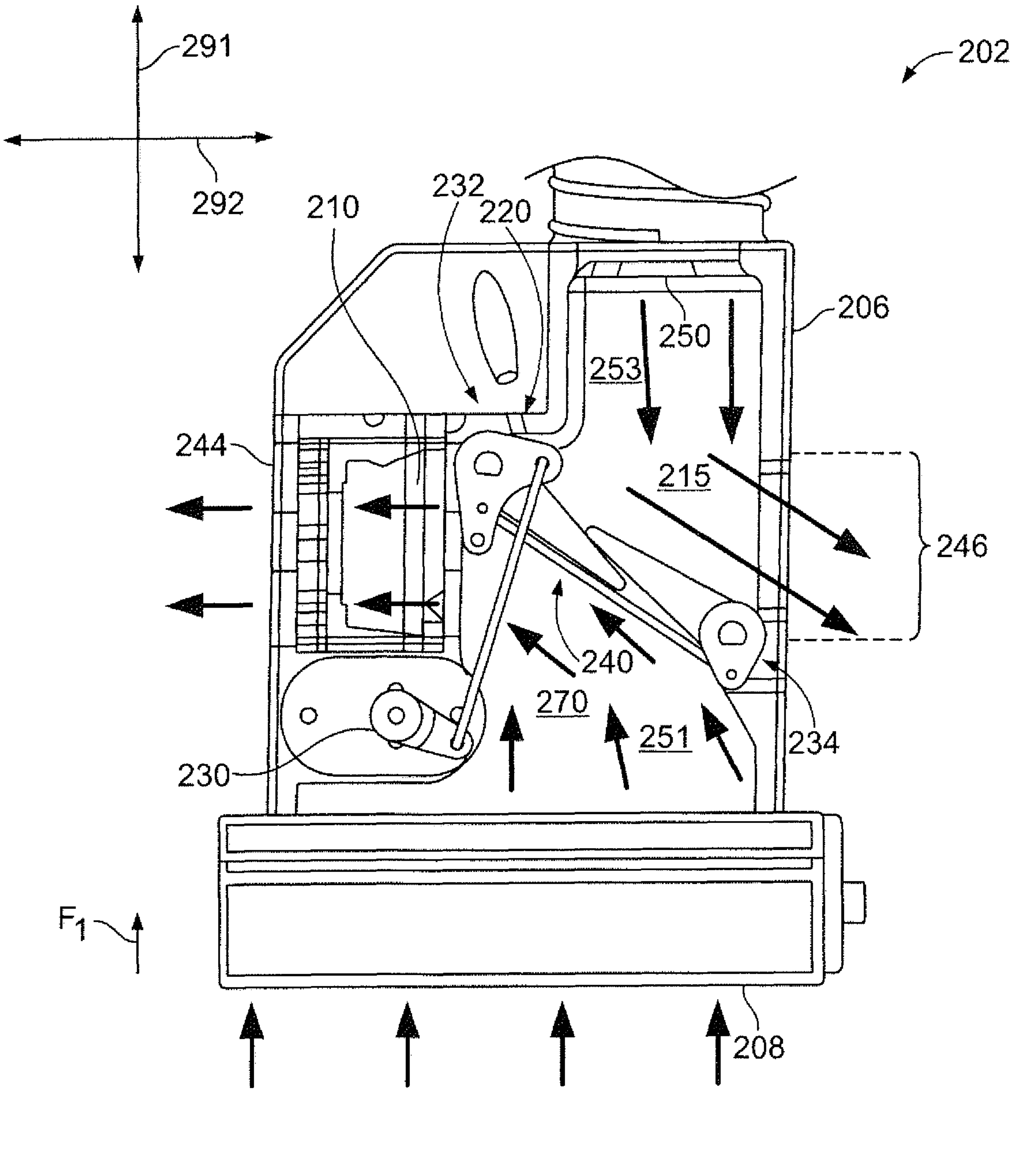
FIG. 4 is an exposed side view of the label applicator of FIG. 2A during the holding mode.
Figure 5:
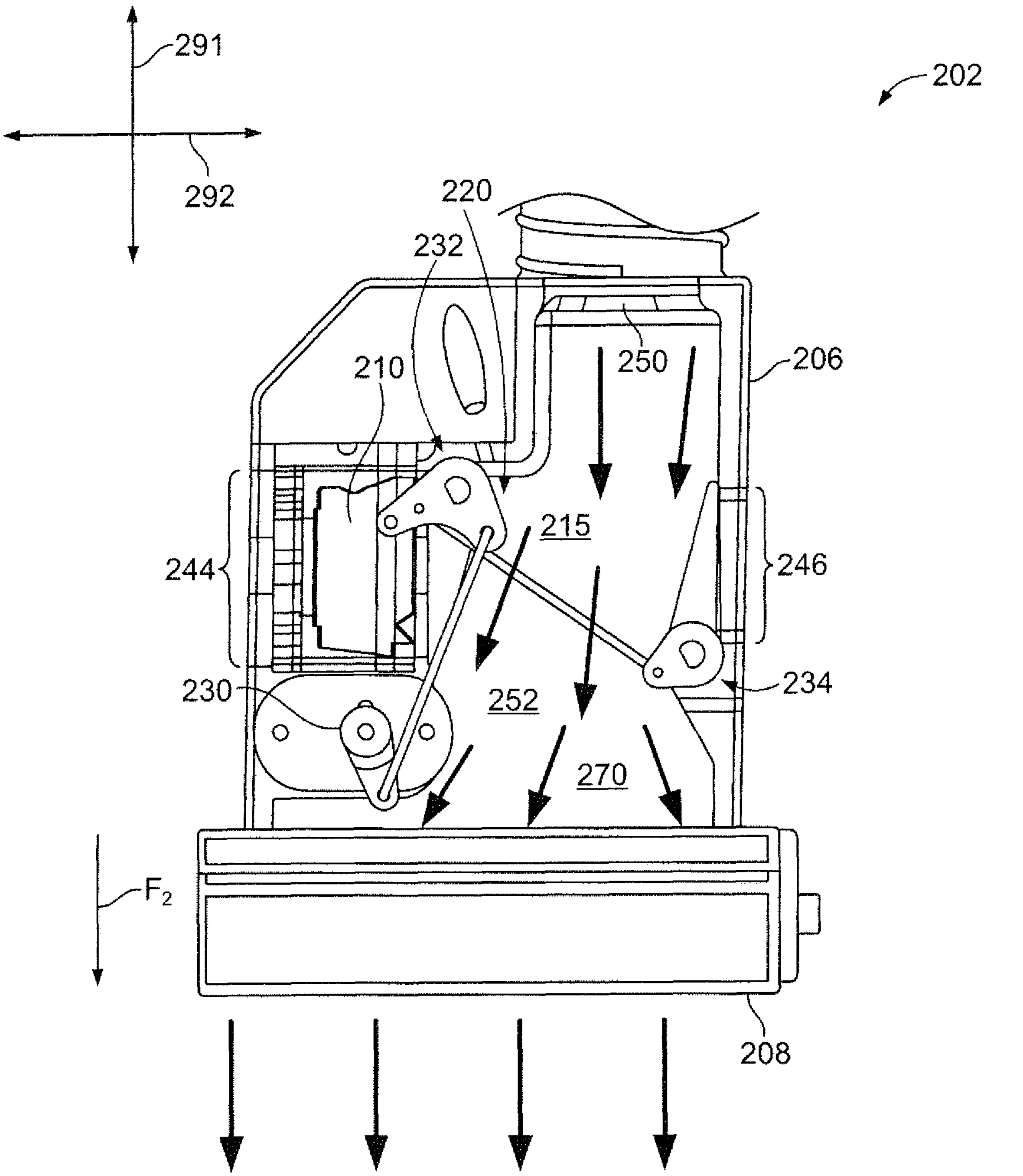
FIG. 5 is an exposed side view of the label applicator of FIG. 2A during the ejection mode.

FIG. 3 illustrates the valve mechanism 220. FIG. 3 shows a configuration of the valve mechanism 220 during the holding mode 286 and a configuration of the valve mechanism 220 during the ejection mode 288. With reference to FIG. 2B and FIG. 3, the valve mechanism 220 may include an electric actuator 230 that is operatively coupled to a cover valve 232 and a diverter valve 234. The actuator 230 may also be referred to as an electric motor. The actuator 230 includes a movable joint 237, and the cover and diverter valves 232, 234 include movable joints 238, 239, respectively. The cover and diverter valves 232, 234 include body portions 233, 235, respectively, that are configured to be disposed in the flow chamber 215 (FIGS. 2B, 4, and 5). The body portions 233, 235 may also be referred to as baffles. During operation of the label applicator 202 (FIG. 2A), the body portions 233, 235 are configured to direct the air flow through the flow chamber 215. To this end, the cover and diverter valves 232, 234 along with other components of the label applicator 102 may define flow channels. As used herein, the term "direct," when used with respect to the cover and diverter valves 232, 234 and the respective body portions 233, 235, includes at least one of changing a general direction of the air flow or impeding the air flow. Impeding the air flow may include fully blocking the flow of air or only substantially blocking the flow of air.

The valve mechanism 220 also includes linkages 260 and 262. The linkage 260 mechanically and operatively couples the movable joints 237 and 238. The linkage 262 mechanically and operatively couples the movable joints 238 and 239. As shown, each of the linkages 260, 262 constitutes a single beam or bar that extends between the corresponding movable joints. In alternative embodiments, the linkages 260, 262 may include more than one beam and/or other parts. Moreover, the beam is not required to be linear as shown in FIG. 3. Instead, the linkages 260, 262 may be shaped (e.g., bent, twisted, and the like) as desired. In the illustrated embodiment, the movable joints 237-239 may constitute projections or levers that rotate about axes of rotation 247-249 (shown in FIG. 3), respectively. In alternative embodiments, however, at least one of the movable joints 237-239 may at least partially slide in an axial direction.

As shown in FIG. 3, when the valve mechanism 220 is configured for the holding mode as shown at 286, the valve mechanism 220 is in a first configuration in which each of the cover and diverter valves 232, 234 and the actuator 230 have designated orientations with respect to each other. In the first configuration, the cover valve 232 is in a first position (or holding position) and the diverter valve is in a first position (or holding position). To more easily distinguish the positions, the first position for the cover valve 232 is hereinafter referred to as the first cover position, and the first position for the diverter valve 234 is hereinafter referred to as the first diverter position. The movable joint 237 is positioned such that the movable joints 238, 239 hold the body portions 233, 235 proximate or adjacent to each other. For example, the body portions 233, 235 may be substantially aligned such that the body portions 233, 235 form a common wall 240 as shown in FIG. 3. The common wall 240 may be configured to substantially block air flow. In the illustrated embodiment, the body portions 233, 235 overlap each other when forming the common wall 240. In other embodiments, the body portions 233, 235 may contact each other end-to-end.

Also shown in FIG. 3, when the valve mechanism 220 is configured for the ejection mode as shown at 288, the valve mechanism 220 is in a second configuration in which each of the cover and diverter valves 232, 234 and the actuator 230 have designated orientations with respect to each other. In the second configuration, the cover valve 232 is in a second cover position (or application position) and the diverter valve is in a second diverter position (or application position). In the illustrated embodiment, when the valve mechanism 220 transitions from the holding mode to the ejection mode, the cover and diverter valves 232, 234 move concurrently with respect to each other. For example, the cover and diverter valves 232, 234 may move during time periods that are at least partially overlapping. In some cases, the cover and diverter valves 232, 234 can only move at the same time. However, in alternative embodiments, the cover and diverter valves 232, 234 may be configured to move at separate times.

The first and second cover positions are different, and the first and second diverter positions are different. For example, in the second configuration, the movable joint 237 has been rotated about 45° in a clockwise direction about the axis 247 with respect to the movable joint 237 in the first configuration; the movable joint 238 has been rotated about 45° in a clockwise direction about the axis 248 with respect to the movable joint 238 in the first configuration; and the movable joint 239 has also been rotated about 45° in a clockwise direction about the axis 249 with respect to the movable joint 239 in the first configuration. Although a direction and an amount of rotation is substantially the same for the movable joins 237-239 in the illustrated embodiment, the direction and/or the amount of rotation may be different. In the second configuration, each of the body portions 233, 235 are separate from each other so that air may flow therebetween.

FIGS. 4 and 5 show exposed side views of the label applicator 202 during the holding mode and the ejection mode, respectively. FIGS. 4 and 5 show the flow chamber 215 of the applicator housing 206, the suction generator 210, and the valve mechanism 220. Several arrows have been provided in FIGS. 4 and 5 to indicate the flow of air through and out of the flow chamber 215 during the suction and ejection modes.

The applicator housing 206 includes various fluid ports where air may enter and/or exit the applicator housing 206 (or the flow chamber 215). Flow rate and direction of air flow through the fluid ports may be determined by the valve mechanism 220, the suction and blow generators 210 (FIG. 2B), 212 (FIG. 2A), and dimensions of the fluid ports. For example, the fluid ports of the applicator housing 206 may include a suction vent 244, a blow vent 246, the one or more openings 209 (FIG. 7) of the suction side 208, and an air inlet 250. The suction vent 244 defines a fluid port through which the air flow provided by the suction generator 210 exits the applicator housing 206 during the holding mode as shown in FIG. 4. The blow vent 246 defines a fluid port through which the air flow provided by the blow generator 212 (FIG. 2A) exits the applicator housing 206 during the holding mode as shown in FIG. 4. The one or more openings of the suction side 208 allow air to pass therethrough in either the first direction $F_1$ (FIG. 4) during the holding mode or the opposite second direction $F_2$ (FIG. 5) during the ejection mode. The inlet 250 defines a fluid port through which air is received from the blow generator 212 (FIG. 2A).

The valve mechanism 220 may selectively move the cover and diverter valves 232, 234 relative to the applicator housing 206 in the flow chamber 215. For example, the valve mechanism 220 may move and hold a valve (e.g., the cover valve 232 or the diverter valve 234) at a first desired position for a designated time period or until a designated condition occurs. When the designated time period elapses or the designated condition has occurred, the valve mechanism 220 may move the valve to a different second desired position and hold the valve at the second desired position for a designated time period or until another condition occurs. The designated conditions may be, for example, a sensor (not shown) detecting that a label is being held against the suction side and/or a sensor detecting that a label has been ejected from the suction side or is attached to the target object.

Operation of the valve mechanism 220 may be controlled by a computing system (not shown) of the label applicator 202. By way of example, the actuator 230 of the valve mechanism 220 may selectively move the cover valve 232 between the first and second cover positions and the diverter valve 234 between the first and second diverter positions as described above with respect to FIG. 3. The actuator 230 may move the cover and diverter valves 232, 234 simultaneously.

The valve mechanism 220 is configured to move the cover and diverter valves 232, 234 to different positions to form first, second, and third flow channels 251-253 through the flow chamber 215. In particular, the first and third flow channels 251, 253 exist during the holding mode. In the holding mode, the cover valve 232 is in the first cover position, and the diverter valve 234 is in the first diverter position. As shown in FIG. 4, the suction generator 210 provides the air flow through the first flow channel 251 during the holding mode. The first flow channel 251 extends and flows from the one or more holes of the suction side 208 to the suction vent 244. The air flow in the first flow channel 251 causes air that is exterior to the applicator housing 206 along the suction side 208 to flow in the first direction $F_1$ through the one or more holes and into the flow chamber 215. The air then flows through the suction generator 210 and the suction vent 244. During the holding mode, the air flow through the suction side 208 in the first direction $F_1$ causes a suction force. The suction force may be configured to pull a label 271 (FIGS. 6 and 7), such as the label 114, toward the suction side 208 and hold the label against the suction side 208.

The blow generator 212 (FIG. 2A) may continuously operate during the holding and ejection modes. The valve mechanism 220 and the applicator housing 206 are configured to provide the third flow channel 253 so that the air flow provided by the blow generator 212 may exit the flow chamber 215 during the holding mode. The air flow in the third flow channel 253 flows from the inlet 250 to the blow vent 246. The flow rate through the third flow channel 253 may be greater than the flow rate through the first flow channel 251. In alternative embodiments, the blow generator 212 does not operate continuously by operates intermittently.

As shown in FIG. 5, the second flow channel 252 exists during the ejection mode. In the ejection mode, the cover valve 232 is in the second cover position, and the diverter valve 234 is in the second diverter position. In the second diverter position, the diverter valve 234 blocks the air from flowing through the blow vent 246. In the second cover position, the cover valve 232 blocks the air from flowing through the suction generators 210 and/or the suction vent 244. As shown, the air flow provided by the blow generator 212 may flow between the cover and diverter valves 232, 234 and exit through the suction side 208 in the second direction $F_2$. As shown in FIG. 5, the air flow provided by the blow generator 212 flows in an approximately linear direction between the inlet 250 and the one or more openings of the suction side 208. The linear direction may be substantially along the mounting axis 291. However, in alternative embodiments, the air flow through the second flow channel 252 is not substantially linear.

Accordingly, in the illustrated embodiment, each of the first and second flow channels 251, 252 include the one or more openings of the suction side 208, but at different operating modes of the label applicator 202. Each of the second and third flow channels 252, 253 include the inlet 250, but also at different operating modes of the label applicator 202.

In the illustrated embodiment shown in FIG. 4, the air flows through the first and third flow channels 251, 253 are in substantially opposite directions. More specifically, the air entering the first flow channel 251 through the suction side 208 flows in a direction along the mounting axis 291 (FIG. 2A). The air entering the third flow channel 253 through the inlet 250 flows in an opposite direction along the mounting axis 291. Likewise, the air exiting the first flow channel 251 flows in a direction along the lateral axis 292 (FIG. 2A), and the air exiting the third flow channel 253 flows in an approximately opposite direction along the lateral axis 292. However, the above is simply one example and the first and second flow channels 251, 253 may have different configurations in other embodiments.

In particular embodiments, the cover valve 232 and the diverter valve 234 form the common wall 240 in the flow chamber 215 during the holding mode. The common wall 240 effectively separates the first and third flow channels 251, 253. Moreover, in particular embodiments, the first and second flow channels 251, 252 may share a common region 270 (FIGS. 4 and 5). The common region 270 is a portion of the flow chamber 215 that extends from the common wall 240 to the suction side 208. At least one of the cover valve 232 or the diverter valve 234 may move through the common region 270. For example, the cover valve 232 moves through the common region 270 in the illustrated embodiment.

Although the above-described label applicator includes a diverter valve and a cover valve, in other embodiments, the label applicator may include only a diverter valve. For example, the diverter valve 234 may be sized and shaped to extend entirely across the flow chamber 215 thereby separating the first and third flow channels 251, 253. In this position, the suction generator 210 may be activated to provide the suction force. For the subsequent ejection mode, the diverter valve 234 may then be moved to cover the blow vent 246. The suction generator 210 may be deactivated. The blow generator 212 may generate an air flow through the suction side 208 that is sufficient for ejecting the label onto the target object.

Figure 6:
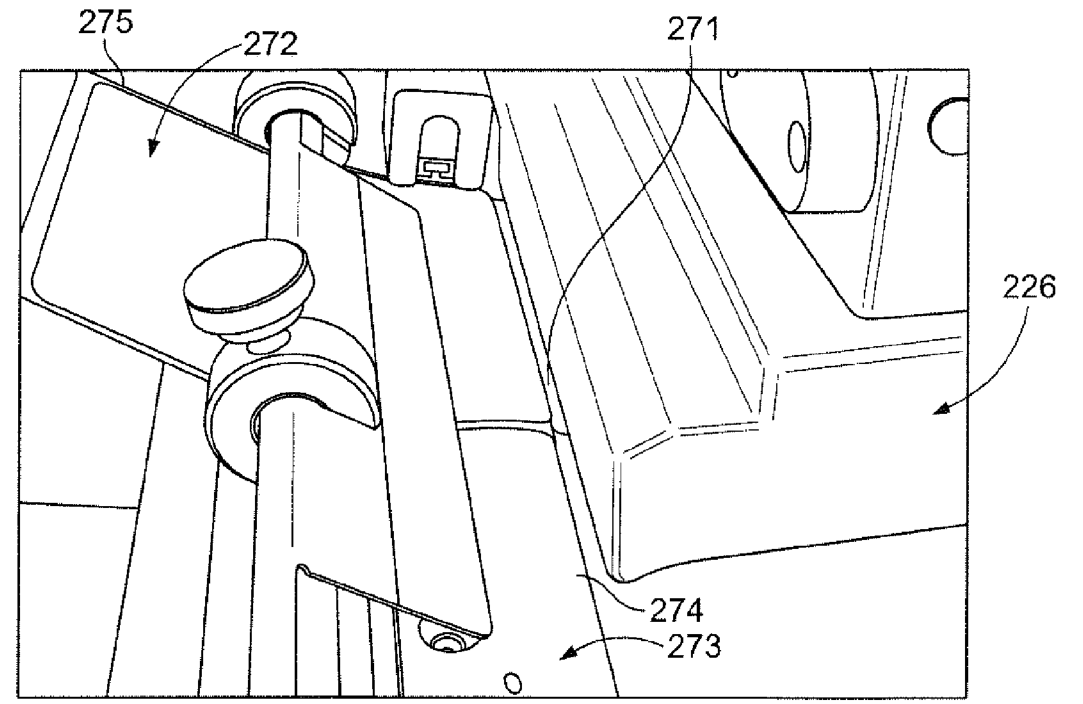
FIG. 6 is a perspective view of a grid plate assembly being fed label in accordance with one embodiment.
Figure 7:
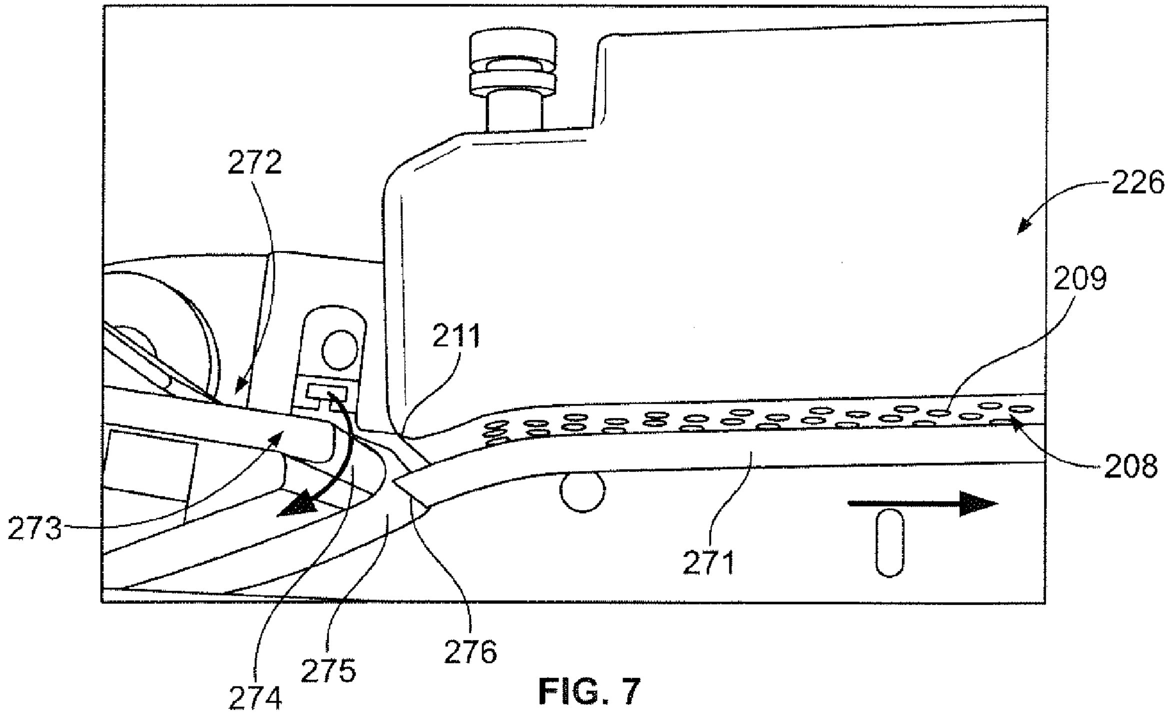
FIG. 7 is an enlarged view of the grid plate assembly being fed a label.

FIGS. 6 and 7 are enlarged views that illustrate the grid plate assembly 226 being fed a label 271 from a web 272. A label supplier may include a delivery panel 273 having a fold edge 274. As shown in FIG. 7, as the web 272 rolls over the fold edge 274 as indicated by a curved arrow, the label 271 begins to separate (e.g., peel) from a release liner 275 to which the label 271 is adhered. As the web 272 continues to slide over the fold edge 274, the label 271 continues to separate from (e.g., continues to peel off) the release liner 271. The portion of the label 271 that is removed from the release liner 271 slides in a substantially axial manner along the suction side 208 as indicated by a straight arrow. In some embodiments, a trailing edge 276 of the label 271 may remain adhered to the release liner 275 due to, for example, excess adhesive. As shown in FIG. 7, in such embodiments, the leading edge 211 of the grid plate assembly 226 may have a curved contour that projects away from the remainder of the suction side 208. In other words, the leading edge 211 may project in a direction along the mounting axis 291 (FIG. 2A). During an application operation, the label 271 slides under the projected leading edge 211 and may engage the leading edge 211. At this time, the label applicator 202 (FIG. 2A) may be in the holding mode to draw the label 271 toward the suction side 208. The leading edge 211 may facilitate separating the trailing edge 276 of the label 271 from the release liner 275. For example, due to the shape of the leading edge 211, the label 271 may be required to move along a path that causes the trailing edge 276 to separate from the release liner 275.

Figure 8:
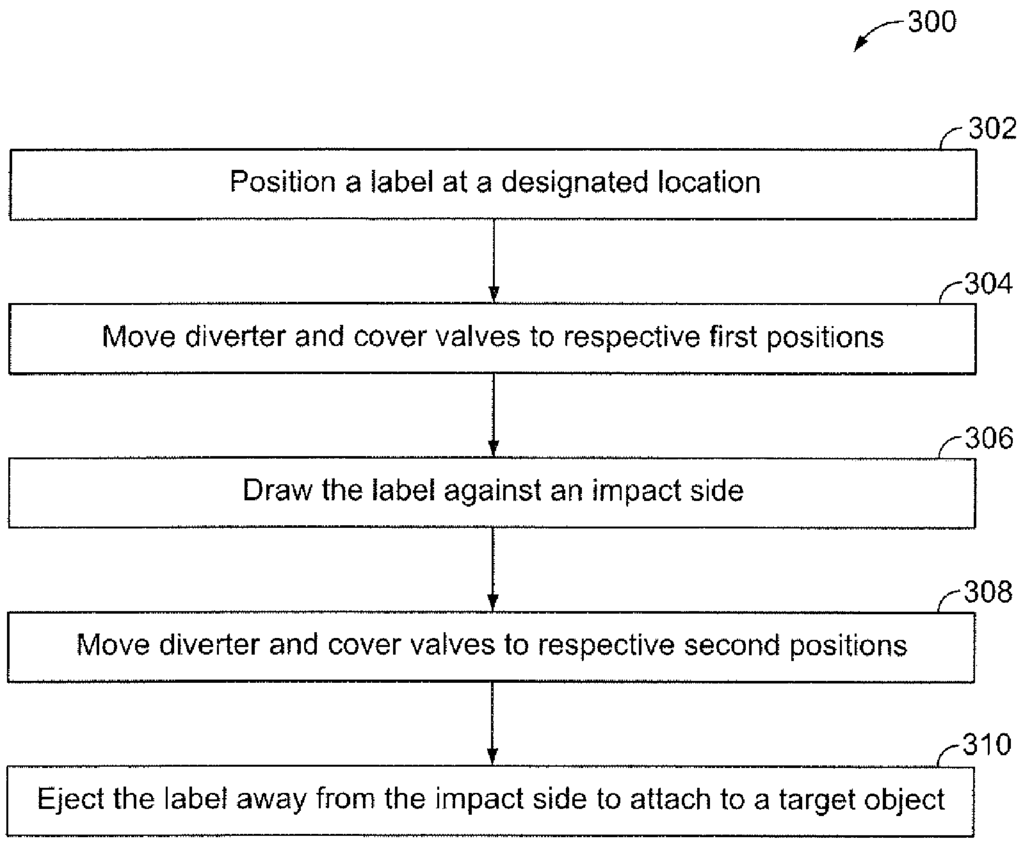
FIG. 8 is a flow chart illustrating a label application method in accordance with one embodiment.

FIG. 8 is a flow chart illustrating a label application method 300 in accordance with one embodiment. The method 300 may be performed by, for example, the label application system 100 (FIG. 1), the label applicators 102, 202, or one or more systems/apparatuses. The method 300 may include positioning at 302 a label at a designated location, such as proximate to a suction side of an applicator housing. The suction side may have one or more openings that allow air to pass therethrough. The applicator housing includes a flow chamber having a diverter valve and a cover valve disposed therein. The method 300 also includes moving at 304 the diverter valve to a first diverter position and the cover valve to a first cover position to form a first flow channel through the flow chamber. It is understood that the moving at 304 may occur before, after, or concurrently with the positioning at 302. The method 300 also includes drawing at 306 the label toward the suction side by providing an air flow through the suction side in a first direction. The air flow in the first direction is provided by a suction generator when the first flow channel is formed. The method 300 also includes moving at 308 the diverter valve to a second diverter position and the cover valve to a second cover position to form a second flow channel through the flow chamber. The first and second flow channels are fluidly coupled to an exterior of the applicator housing through the suction side. The method 300 also includes ejecting at 310 the label away from the suction side by providing an air flow through the suction side in a second direction. The air flow in the second direction is provided by a blow generator when the second flow channel is formed.

As described above, the various embodiments described herein may be implemented using one or more computing systems. The computing system may include a processor (e.g., microprocessor). The processor may be connected to a communication bus. The computing system may also include a memory. The memory may include Random Access Memory (RAM) and Read Only Memory (ROM). The computing system further may include a storage system or device, which may be a hard disk drive or a removable storage drive such as a floppy disk drive, optical disk drive, and the like. The storage system may also be other similar means for loading computer programs or other instructions into the computing system. The instructions may be stored on a tangible and/or non-transitory computer readable storage medium, excluding signals, coupled to one or more servers.

As used herein, the term “computing system” may include any processor-based or microprocessor-based systems including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term “computing system.”

The set of instructions may include various commands that instruct the computing system as a processing machine to perform specific operations such as the methods and processes described herein. The set of instructions may be in the form of a software program or module. The software may be in various forms such as system software or application software. Further, the software may be in the form of a collection of separate programs, a program module (or module) within a larger program, or a portion of a program module. The software also may include modular programming in the form of object-oriented programming. The processing of input data by the processing machine may be in response to user commands, or in response to results of previous processing, or in response to a request made by another processing machine. The program is complied to run on both 32-bit and 64-bit operating systems. A 32-bit operating system like Windows XP™ can only use up to 3 GB bytes of memory, while a 64-bit operating system like Window’s Vista™ can use as many as 16 exabytes (16 billion GB).

As used herein, the terms “software” and “firmware” are interchangeable, and include any computer program stored in memory for execution by a computing system, including RAM memory, ROM memory, EPROM memory, EEPROM memory, and non-volatile RAM (NVRAM) memory. The above memory types are exemplary only, and are thus not limiting as to the types of memory usable for storage of a computer program.

In one embodiment, a label applicator is provided that includes an applicator housing including a flow chamber and a suction side. The suction side has one or more openings that allow air to pass therethrough. The label applicator also includes a valve mechanism having a diverter valve and an electric actuator. The actuator is configured to selectively move the diverter valve in the flow chamber between a first diverter position when the valve mechanism is in a holding mode and a second diverter position when the valve mechanism is in an ejection mode. A label is held against the suction side during the holding mode and propelled away from the suction side during the ejection mode. The label applicator also includes a suction generator for providing a first air flow through the suction side of the applicator housing in a first direction during the holding mode. The diverter valve is in the first diverter position during the holding mode. The label applicator also includes a blow generator for providing a second air flow through the suction side of the applicator housing in a second direction during the ejection mode. The second direction is opposite the first direction, and the diverter valve is in the second diverter position during the ejection mode.

In one embodiment, a label applicator is provided that includes an applicator housing having a flow chamber and a suction side. The suction side has one or more openings that allow air to pass therethrough. The label applicator also includes first and second air flow generators that are fluidly coupled with the flow chamber. The first and second air flow generators are configured to generate first and second air flows, respectively, through the flow chamber. The label applicator also includes a valve mechanism that is positioned in the flow chamber to direct the first and second air flows through the flow chamber of the applicator housing. The valve mechanism includes a diverter valve and an electric actuator. The actuator is configured to move the diverter valve within the flow chamber to a holding position to direct the first air flow generated by the first air flow generator through the suction side into the flow chamber to hold a label to the suction side. The actuator is also configured to move the diverter valve within the flow chamber to an application position to direct the second air flow generated by the second air flow generator through the suction side to force the label away from the suction side toward a target object in order to apply the label to the target object.

In one aspect, the second air flow generator includes an electric high-pressure blower. The high-pressure blower may be secured to the applicator housing. Also, the applicator housing and the high-pressure blower may be transportable as a unit.

In another aspect, the applicator housing may have a blow vent. The diverter valve may direct the second air flow provided by the second air flow generator through the blow vent when the diverter valve is in the holding position.

In another aspect, the valve mechanism includes a cover valve. The cover valve may be configured to direct the first air flow provided by the first air flow generator. The cover valve may be configured to be in a corresponding holding position when the diverter valve is in the corresponding holding position and in a corresponding application position when the diverter valve is in the corresponding application position. The cover valve and the diverter valve may be configured to be moved concurrently. In some cases, the cover and diverter valves are substantially aligned with each other to form a common wall when the label is held to the suction side.

In another aspect, a first flow path is formed when the diverter valve is in the holding position and a second flow path is formed when the diverter valve is in the application position. The flow chamber may include a common region that is shared by the first and second flow paths.

In another aspect, the first and second air flow generators are operable such that air pressure along the suction side is configured to draw a label against the suction side during a holding mode and configured to eject the label from the suction side during an ejection mode.

In another embodiment, a label applicator is provided that includes an applicator housing having a flow chamber and having a suction side and a blow vent. Each of the suction side and the blow vent has one or more openings that allow air to pass therethrough. The label applicator also includes an electric high-pressure blower that is coupled to the applicator housing and is configured to provide an air flow through the flow chamber. The label applicator also includes a valve mechanism having a diverter valve and an electric actuator. The actuator is configured to selectively move the diverter valve between holding and application positions. The diverter valve directs the air flow provided by the high-pressure blower through the blow vent when in the holding position and through the suction side when in the application position to apply a label to a target object.

In one aspect, the diverter valve substantially impedes the air flow provided by the high-pressure blower through the blow vent when in the application position.

In another aspect, the high-pressure blower is operable such that air pressure along the suction side when the diverter valve is in the application position is sufficient to eject a label away from the suction side so that the label is pressed against a target object.

In another aspect, the air flow provided by the high-pressure blower flows in an approximately linear direction between a port that fluidly couples the high-pressure blower to the applicator housing and the suction side.

In another aspect, the label applicator includes a suction generator for providing an air flow through the suction side during a holding mode in which the label is held to the suction side. The diverter valve is in the holding position during the holding mode. The valve mechanism may include a cover valve, wherein the cover valve is configured to direct the air flow provided by the suction generator during the holding mode. The cover valve may be configured to be in a corresponding holding position when the diverter valve is in the corresponding holding position and in a corresponding application position when the diverter valve is in the corresponding application position. The cover and diverter valves may also be substantially aligned with each other to form a common wall during the holding mode.

In another embodiment, a label application method is provided that includes positioning a label along a suction side of an applicator housing. The suction side has one or more openings that allow air to pass therethrough. The applicator housing includes a flow chamber having a diverter valve and a cover valve disposed therein. The method also includes moving the diverter valve and the cover valve to corresponding holding positions to form a first flow channel through the flow chamber. The method also includes drawing the label toward the suction side by providing a first air flow through the first flow channel and through the suction side in a first direction, wherein the first air flow in the first flow channel is provided by a suction generator. The method further includes moving the diverter valve and the cover valve to corresponding application positions to form a second flow channel through the flow chamber. The first and second flow channels are fluidly coupled to an exterior of the applicator housing through the suction side. The method also includes ejecting the label away from the suction side by providing a second air flow through the second flow channel and through the suction side in a second direction. The air flow in the second flow channel is provided by a blow generator.

In one aspect, the diverter valve also forms a third flow channel through the flow chamber when the first flow channel is formed. The third flow channel being fluidly coupled to a blow vent of the applicator housing and the blow generator.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase “means for” followed by a statement of function void of further structure.

This written description uses examples to disclose several embodiments of the inventive subject matter and also to enable one of ordinary skill in the art to practice the embodiments of inventive subject matter, including making and using any applicators or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word “a” or “an” should be understood as not excluding plural of said elements or steps, unless such exclusion is explicitly stated. Furthermore, references to “one embodiment” of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An applicator comprising:

an applicator housing comprising a flow chamber and a suction side, the suction side having one or more openings that allow air to pass therethrough;

first and second air flow generators fluidly coupled with the flow chamber, the first and second air flow generators configured to generate first and second air flows, respectively, through the flow chamber; and a valve mechanism positioned in the flow chamber to direct the first and second air flows through the flow chamber of the applicator housing, the valve mechanism including a diverter valve and an electric actuator, the diverter valve including first and second elongated baffles coupled with pivoting joints and elongated linkages that connect the pivoting joints with each other and with the electric actuator, a first linkage of the linkages connected with the electric actuator and the pivoting joint coupled with the first elongated baffle, a second linkage of the linkages connected with the pivoting joint coupled with the first elongated baffle and with the pivoting joint coupled with the second elongated baffle.

2. The applicator of claim 1, wherein the second air flow generator includes an electric blower.

3. The applicator of claim 2, wherein the applicator housing and the electric blower are transportable as a unit.

4. The applicator of claim 1, wherein the applicator housing has a blow vent and the diverter valve directs the second air flow provided by the second air flow generator through the blow vent.

5. The applicator of claim 1, wherein the valve mechanism further comprises a cover valve that directs the first air flow provided by the first air flow generator.

6. The applicator of claim 5, wherein the cover valve blocks the first air flow provided by the first air flow generator.

7. The applicator of claim 5, wherein the cover valve and the diverter valve are configured to be moved concurrently.

8. The applicator of claim 5, wherein the cover and diverter valves are substantially aligned with each other to form a common wall when the label is held to the suction side of the applicator housing.

9. The applicator of claim 1, wherein the pivoting joints pivot the elongated baffles in response to the electric actuator moving the first linkage such that the elongated baffles form a first flow path in the flow chamber responsive to the electric actuator moving the first linkage in a first direction and the elongated baffles form a different, second flow path in the flow chamber responsive to the electric actuator moving the first linkage in a different, second direction.

10. The applicator of claim 1, wherein the first and second air flow generators are operable such that air pressure along the suction side of the applicator housing is configured to draw a label against the suction side during a holding mode and configured to eject the label from the suction side during an ejection mode.

11. An applicator comprising:

an applicator housing comprising a flow chamber and having a suction side and a blow vent, each of the suction side and the blow vent having one or more openings that allow air to pass therethrough;

a blower coupled to the applicator housing and configured to provide an air flow through the flow chamber; and a valve mechanism comprising a diverter valve and an electric actuator, the diverter valve including first and second pivoting baffles and first and second elongated linkages, the first pivoting baffle connected with the electric actuator by the first linkage and the second pivoting baffle connected with the first pivoting baffle by the second linkage such that movement of the first linkage by the electric actuator in a first direction causes the first and second pivoting baffles to pivot toward each other and direct the air flow out of the flow chamber through the blow vent and movement of the first linkage by the electric actuator in a different, second direction causes the first and second pivoting baffles to pivot away from each other and direct the air flow out of the flow chamber through the suction side.

12. The applicator of claim 11, wherein the first and second pivoting baffles substantially impede the air flow provided by the blower through the blow vent responsive to the electric actuator moving the first linkage in the first direction.

13. The applicator of claim 11, wherein the first and second pivoting baffles are connected with each other and with the electric actuator by the first and second linkages such that the first and second pivoting baffles direct the air flow through the suction side of the applicator housing responsive to the electric actuator moving the first linkage in the first direction to eject a label away from the suction side.

14. The applicator of claim 11, wherein the air flow provided by the blower flows in an approximately linear direction between a port that fluidly couples the blower to the applicator housing and the suction side.

15. The applicator of claim 11, further comprising a suction generator for providing an air flow through the suction side of the applicator housing.

16. The applicator of claim 11, wherein the valve mechanism further comprises a cover valve positioned to direct the air flow provided by the suction generator.

17. The applicator of claim 11, wherein the cover and diverter valves are substantially aligned with each other to form a common wall.

18. The applicator of claim 9, wherein the flow chamber includes a common region that is shared by the first and second flow paths.

19. The applicator of claim 1, wherein the pivoting joints of the first and second elongated baffles are connected with each other by the second linkage and the pivoting joint of the first elongated baffle is connected with the electric actuator by the first linkage such that movement of the first linkage by the electric actuator in a first direction causes the pivoting joints of the first and second elongated baffles to pivot the first and second elongated baffles into contact with each other and movement of the first linkage by the electric actuator in an opposite second direction causes the pivoting joints of the first and second elongated baffles to pivot the first and second elongated baffles away from each other.

20. The applicator of claim 19, wherein the first and second elongated baffles block the air flow from exiting the flow chamber through the suction side when the first and second elongated baffles contact each other, and wherein the first and second elongated baffles direct the air flow out of the flow chamber through the suction side when the first and second elongated baffles pivot away from each other.

21. A label applicator comprising:

a housing having a flow chamber and a suction side to which a label is held;

a first elongated baffle pivotally mounted in the flow chamber;

a second elongated baffle pivotally mounted in the flow chamber;

an actuator;

a first elongated linkage coupled with the actuator and the first elongated baffle;

a second elongated linkage coupled with the first elongated baffle and the second elongated baffle, wherein the first elongated linkage is coupled with the actuator and the first elongated baffle and the second elongated linkage is coupled with the first elongated baffle and the second elongated baffle such that movement of the first elongated linkage by the actuator in a first direction pivots the first and second elongated baffles toward each other to block air flow from exiting the flow chamber of the housing through the suction side and movement of the first elongated linkage by the actuator in an opposite second direction pivots the first and second elongated baffles away from each other to allow the air flow from exiting the flow chamber of the housing through the suction side.

* * * * *